Sept. 7, 1954     J. C. BUSQUET     2,688,719
MOTOR CIRCUIT CONTROL MEANS
Filed July 25, 1951
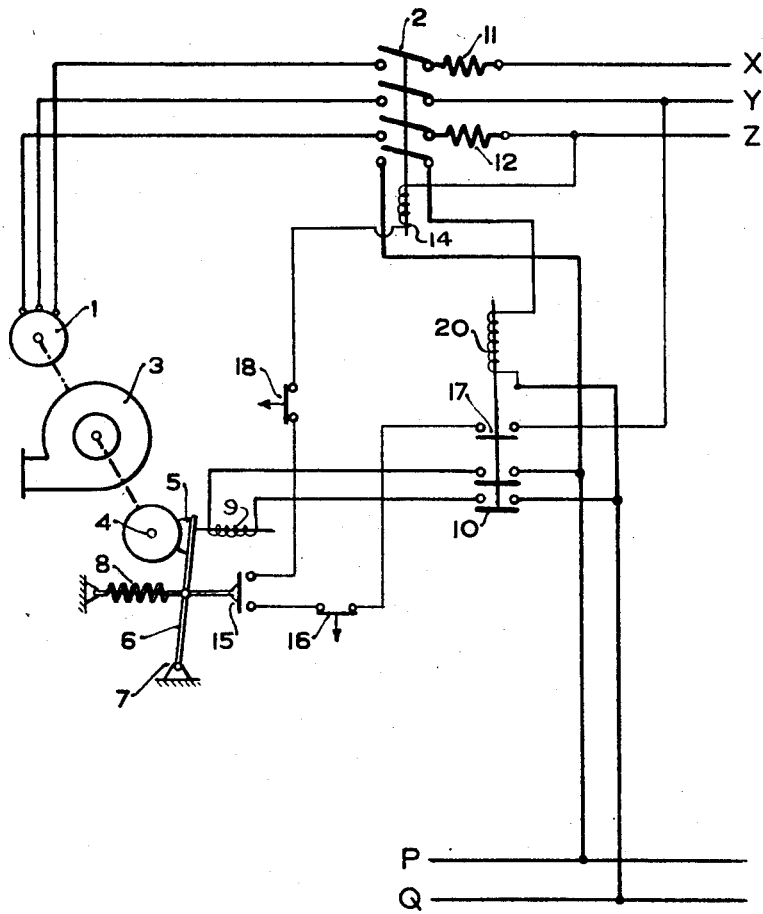
INVENTOR
JAN C. BUSQUET,
BY
ATTORNEY Patented Sept. 7, 1954

2,688,719

UNITED STATES PATENT OFFICE 2,688,719

MOTOR CIRCUIT CONTROL MEANS

Jan C. Busquet, Hengelo, Netherlands, assignor to Koninklijke Machinefabriek Gebr. Stork & Co., N. V., Hengelo, Netherlands, a corporation of the Netherlands Application July 25, 1951, Serial No. 238,549

2 Claims. (Cl. 318—372)

This invention relates to motor circuit control means and is particularly concerned with a control circuit having interdependent safety devices responsive to the characteristics of operation of the instrumentalities actuated by the motor. More particularly the invention provides a control means for a mine ventilator provided with adjustable propeller vanes. The adjustable propeller vanes are used in such cases in order to vary the quantity of ventilating air without the necessity of variable speed motors. Such motors are costly. Therefore it is desirable to use normal three phase constant speed motors.

It is desirable in such devices to decrease to the minimum the duration of a stop, during the change from one vane position to another, because of the need for fresh air in the mine. The normal time for slowing down after switching off the motors driving the ventilator is very long. In view of the security of the mine a mutual locking of the brake and the main switch of the motors is very desirable. The invention aims at an efficient solution of this problem.

Referring to the schematic diagram of the drawing, the numeral 1 represents a constant speed three phase motor to be energized from a three phase power represented by the current supply lines X, Y and Z and controlled by a normally open switch 2. The motor shaft is coupled to a blower 3, the shaft of which is provided with a brake drum 4. A brake shoe 5 supported by the extremity of an arm 6, pivotally mounted at 7, is operable to frictionally restrain rotation of the blower shaft. A spring 8 normally urges the brake shoe 5 against the drum 4 while an electromagnetic coil 9 acts upon energization thereof to hold the shoe in brake releasing position. A secondary circuit independently supplied with current from conductors P and Q includes a switch 10 for controlling energization of the coil 9. As customary in motor control circuits, overload coils 11 and 12 may be provided. Though manually operable for the initial closing, the switch 2 includes an electromagnetic holding coil 13 and a secondary switch 14. Energization of the coil 13 for maintaining the switch 2 in closed, motor energizing position is provided by a tertiary circuit leading from conductors Y and Z and including circuit control switch 15 operatively connected with the brake arm 6 to be closed when the brake is released; 16 operatively connected with a blower blade adjusting means to be normally closed but opened by manipulation of such means; 17 associated with and operable by switch 10 of the secondary circuit; and normally closed switch 18 operatively connected with and responsive to the blower operation as by thermostatic response to overheating of a blower shaft bearing. The switch 10, and with it the switch 17, is normally open but is moved to and held closed by an electromagnetic holding coil 20 energized by a branch of the secondary circuit under the control of switch 14.

In the operation of the circuit, upon manual closing of the switch 2, the motor 1 is energized and at the same time switch 14 is closed energizing coil 20 which closes switches 10 and 17. The closing of switch 10 energizes coil 9 releasing brake 5, which in turn closes switch 15. Since switches 16 and 18 are normally closed, the closing of switches 15 and 17 completes the circuit to the holding coil 13 by which the switch 2 is retained in its closed position.

In the event of malfunction of the blower 3 such as an overheating of a bearing, the switch 18 will open, thus terminating energization of holding coil 13, whereupon switch 2 will open terminating energization of the motor and therewith switch 14 will be opened terminating energization of the actuating coil 20 of switch 17 and breaking the circuit to coil 9 so that spring 8 will immediately apply the brake 5. Similarly if the blower blade adjusting means is manipulated, switch 16 will be opened and the same responses will be had. It is also true that if the main switch 2 is opened manually against the urging of coil 13, motor energization will be terminated and the brake will be instantly applied.

From the foregoing it will be seen that the invention provides a combined motor and brake control means whereby the brake will be instantly applied upon deenergization of the motor. It will further be seen that control may be accomplished by either the blower responsive switch 18 or the adjusting means switch 16. With respect to the latter, the control is particularly adapted for mine ventilation blowers where it is desirable to reduce to a minimum the down time of the motor when blade adjustments are required.

What I claim is:

1. In a motor circuit control means of the character set forth the combination of an electric motor, a shaft driven by said motor, a brake portion operatively connected with said shaft, a brake part movable toward and from said brake portion and normally moved toward said brake portion and cooperative therewith to brake said shaft, electro-magnetic means for moving said brake part from said brake portion to release said shaft, a control switch in circuit with said electromagnetic means, a main switch for said motor, a holding coil for said main switch, a switch in circuit with said holding coil and mechanically coupled with said brake part to be opened and deenergize said holding coil to open said main switch upon movement of said brake part to braking position, and an auxiliary switch coupled with said electro-magnetic means control switch and in circuit with said holding coil and said brake switch.

2. The combination set forth in claim 1, wherein said electro-magnetic means control switch is actuated by a coil in circuit with said auxiliary switch element coupled with said main switch.

References Cited in the file of this patent

UNITED STATES PATENTS

| Number | Name | Date |
|---|---|---|
| 674,840 | Hoffmann | May 21, 1901 |
| 893,536 | Newell | July 14, 1908 |
| 1,014,216 | Gale | Jan. 9, 1912 |
| 1,018,253 | McWilliams et al. | Feb. 20, 1912 |
| 1,947,712 | Grosswege | Feb. 20, 1934 |
| 2,514,694 | Chapman | July 11, 1950 |